United States Patent
Quak et al.

(10) Patent No.: US 6,751,036 B2
(45) Date of Patent: Jun. 15, 2004

(54) TUNING TRACK DENSITY FOR DATA STORAGE DEVICE

(75) Inventors: Beng Wee Quak, Singapore (SG); KokHoe Chia, Singapore (SG); Kwee Teck Say, Singapore (SG); KianKeong Ooi, Singapore (SG); Soon Wah Leow, Singapore (SG); Song Wee Teo, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 235 days.

(21) Appl. No.: 09/902,428

(22) Filed: Jul. 10, 2001

(65) Prior Publication Data

US 2002/0036853 A1 Mar. 28, 2002

Related U.S. Application Data

(60) Provisional application No. 60/222,987, filed on Aug. 4, 2000.

(51) Int. Cl.⁷ .............................. G11B 5/09; G11B 27/36
(52) U.S. Cl. .............................. 360/48; 360/53; 360/31; 360/77.04; 360/25; 360/69
(58) Field of Search ........................ 360/48, 31, 77.04, 360/25, 53, 69

(56) References Cited

U.S. PATENT DOCUMENTS

| | | | |
|---|---|---|---|
| 4,414,589 A | * 11/1983 | Oliver et al. ............ | 360/77.07 |
| 4,945,427 A | 7/1990 | Cunningham ................. | 360/75 |
| 5,596,458 A | 1/1997 | Emo et al. ..................... | 360/48 |
| 5,870,237 A | 2/1999 | Emo et al. ..................... | 360/48 |
| 5,999,351 A | 12/1999 | Albrecht et al. ............... | 360/48 |
| 6,061,195 A | 5/2000 | Wilson et al. ................. | 360/48 |
| 6,061,197 A | * 5/2000 | Wiselogel ..................... | 360/60 |
| 6,075,665 A | 6/2000 | Chainer et al. ............... | 360/48 |
| 6,091,559 A | 7/2000 | Emo et al. ..................... | 360/48 |
| 6,130,796 A | * 10/2000 | Wiselogel ..................... | 360/75 |
| 6,137,644 A | * 10/2000 | Hetzler et al. ................ | 360/48 |
| 6,455,521 B1 | * 9/2002 | Seio et al. .................... | 514/218 |
| 6,493,176 B1 | * 12/2002 | Deng et al. .............. | 360/78.05 |

FOREIGN PATENT DOCUMENTS

WO    WO 00/01146    1/2000

OTHER PUBLICATIONS

U.S. patent application Ser. No. 09/873,579, Quak et al., filed Jun. 2001.

* cited by examiner

*Primary Examiner*—David Hudspeth
*Assistant Examiner*—Natalia Figueroa
(74) *Attorney, Agent, or Firm*—Westman, Champlin & Kelly, P.A.

(57) ABSTRACT

A data storage device has a plurality of head/surface combinations with different data track densities on at least two surfaces. A minimum head quality is established for the data storage apparatus. Head quality is identified for each of the heads at each of a plurality of track densities. A tuned track density is selected for each surface based on the track density that corresponds to a head quality.

15 Claims, 3 Drawing Sheets

TUNING TRACK DENSITY FOR DATA STORAGE DEVICE

CROSS-REFERENCE TO RELATED APPLICATION

This application claims priority of U.S. Provisional Patent Application No. 60/222,987 filed Aug. 4, 2000 for "Variable Tracks Per Inch Tuning".

FIELD OF THE INVENTION

This application relates to disc drives, and particularly to tuning the track density of the data storage medium of a data storage device to obtain minimal error rates.

BACKGROUND OF THE INVENTION

Magnetic disc drives are commonly designed with a constant track density across the radius of the disc for both data and servo tracks. The track density is most often expressed as the number of tracks per inch (TPI). For any given family of drives, there will be a fixed number of data and servo tracks. The number of tracks per inch is primarily governed by the head specifications. The head specifications include a definition of off-track capability, which defines the ability of the read head to accurately read data when the head is not exactly centered on the data. If a head fails to meet the required off-track capability, the head fails qualification tests and is not used in the disc drive. Thus, each of the heads of the disc drive must meet the requirements of off-track capabilities.

Ordinarily, the off-track capabilities are inversely related to the head's ability to read data at various track densities. A head with superior off-track capabilities at a required track density may have lower, but still adequate, off-track capability at a higher track density. Similarly, a head with inadequate off-track capabilities at a required track density may exhibit adequate off-track capabilities at a lower track density.

Current designs utilize a fixed data TPI scheme in which all of the data storage surfaces in the drive has the same track density so that every head of the drive is arranged to read and write at the same fixed TPI. If a multi-head drive has one head with inadequate off-track capabilities at the required track density, the drive will fail qualification tests even if the other heads have superior off-track capabilities at the same density. When a drive has one head that fails to meet design requirements, that drive must either be re-worked to replace the head, or reconfigured to a model having a lower storage capacity. There exists a need to compensate for the nominally inadequate heads in disc drives to meet performance requirements without replacing the head or reconfiguring the drive to one of lower capacity. The present invention provides a solution to this and other problems, and offers other advantages over the prior art.

SUMMARY OF THE INVENTION

The present invention is directed to the selection of the track density for the data storage surfaces of a storage device such that a nominally inadequate head can be used in combination with a storage surface at a track density that is lower than required, while another head/surface combination operates at a track density that is higher than required and the drive specifications are met.

In one embodiment, data track densities on each of a plurality of storage surfaces of a data storage apparatus are defined. A minimum head quality rating is established for the data storage apparatus, and a head quality rating is identified for each of the heads for each of a plurality of track densities. A track density is selected for each head based on the minimum head quality rating and the identified head quality ratings. The selected track density is established for the storage surface associated with each respective head.

In some embodiments, the head quality rating is identified from an off-track capability for each head for each of a plurality of track densities. An error rate is identified for each head at each of the plurality of track densities. The head quality rating for each track density for each head is identified from the off-track capability and the corresponding error rate.

In some embodiments, the track density is selected by selecting a candidate track density for each head as that track density that matches the track density corresponding to the minimum head, quality rating. The average of the candidate track densities is compared to the nominal track density. The candidate track density is selected for each storage surface only if the average of the candidate track densities is at least as great as the nominal track density.

In another embodiment a data storage device includes a plurality of head/surface combinations each including a storage surface containing adjacent data storage tracks and a head arranged to transfer information with the data storage tracks. Means establishes different data track densities on at least two storage surfaces. In particular, the means establishing the data track density comprises an arrangement of the data storage tracks at densities defined by an off-track capability of the confronting head.

Other features and benefits that characterize the present invention will be apparent upon reading the following detailed description and review of the associated drawings.

DETAILED DESCRIPTION OF ILLUSTRATIVE EMBODIMENTS

Figure 1:
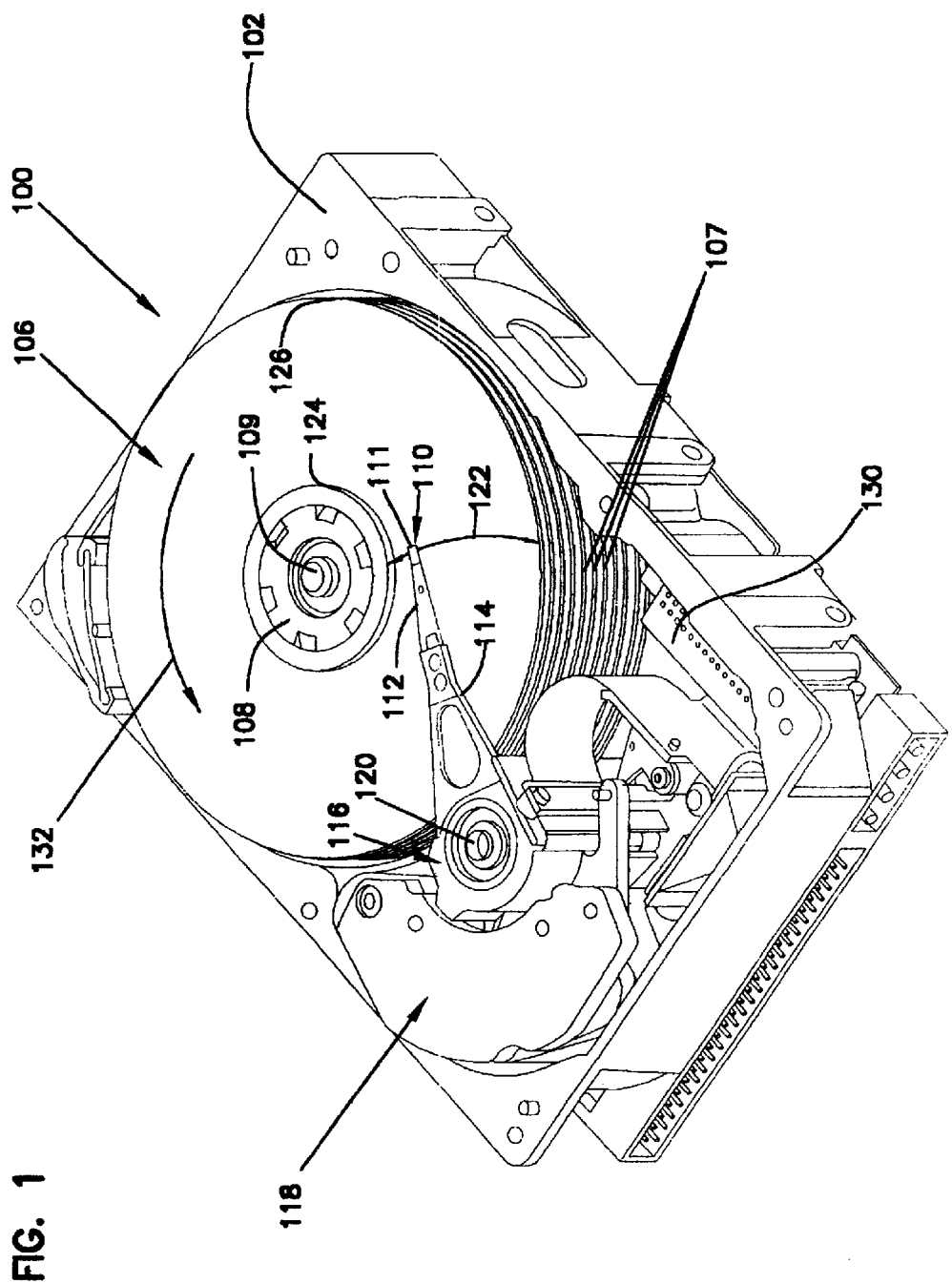
FIG. 1 is a perspective view of a disc drive in which embodiments of the present invention may be practiced.

FIG. 1 is a perspective view of a disc drive 100 in which embodiments of the present invention are useful. Disc drive 100 includes a housing with a base 102 and a top cover (not shown). Disc drive 100 further includes a disc pack 106, which is mounted on a spindle motor (not shown), by a, disc clamp 108. Disc pack 106 includes a plurality of individual discs 107, which are mounted for co-rotation in the direction of arrow 132 about central axis 109. Each disc 107 has a surface associated with a head-slider 110 that is mounted to disc drive 100 for communication with the confronting disc surface. Head-slider 110 includes a slider structure arranged to fly above the associated disc surface of an individual disc of disc pack 106, and a transducing head 111 arranged to write data to, and read data from, concentric tracks on the confronting disc surface. In the example shown in FIG. 1, head-sliders 110 are supported by suspensions 112 which are in turn attached to track accessing arms 114 of an actuator 116. Actuator 116 is driven by a voice coil motor (VCM) 118 to rotate actuator 116, and its attached heads 111, about a pivot shaft 120. Rotation of actuator 116 moves heads 111 along an arcuate path 122 to position heads 111 over a desired data track between a disc inner diameter 124 and a disc outer diameter 126. Voice coil motor 118 is driven by servo electronics included on circuit board 130 based on signals generated by heads 111 of head-sliders 110 and a host computer (not shown). Controller electronics are also included on circuit board 130 to supply signals to the host computer based on data read from disc pack 106 by heads 111 of head-sliders 110, to supply write signals to head 111 of head-sliders 110 to write data to the discs 107 and to provide other essential operations. The controller electronics on circuit board 130 also operates actuator 116 to position head-sliders 110 relative to the respective disc 107 at track centers based on a track density established for the respective surface, of disc 107.

Each disc 107 includes opposite recording surfaces each containing a plurality of concentric tracks between inner and outer diameters 124, 126. Each recording surface is associated with a head-slider 110 that is positioned by actuator 116 to center the head 111 over a selected track. Vibration and other factors can shift the position of head-slider 110 so head 111 is off track center. Consequently, it is important that head 111 be capable of reading data from the track even at specified positions off track center. Some heads 111 perform this task better than others. Embodiments of the present invention are directed to techniques of tuning the TPI of the data storage surfaces in a disc drive so that the sum of the number of tracks on all of the confronting storage surfaces meet the drive storage requirements and all heads meet the off-track requirements.

Figure 2:
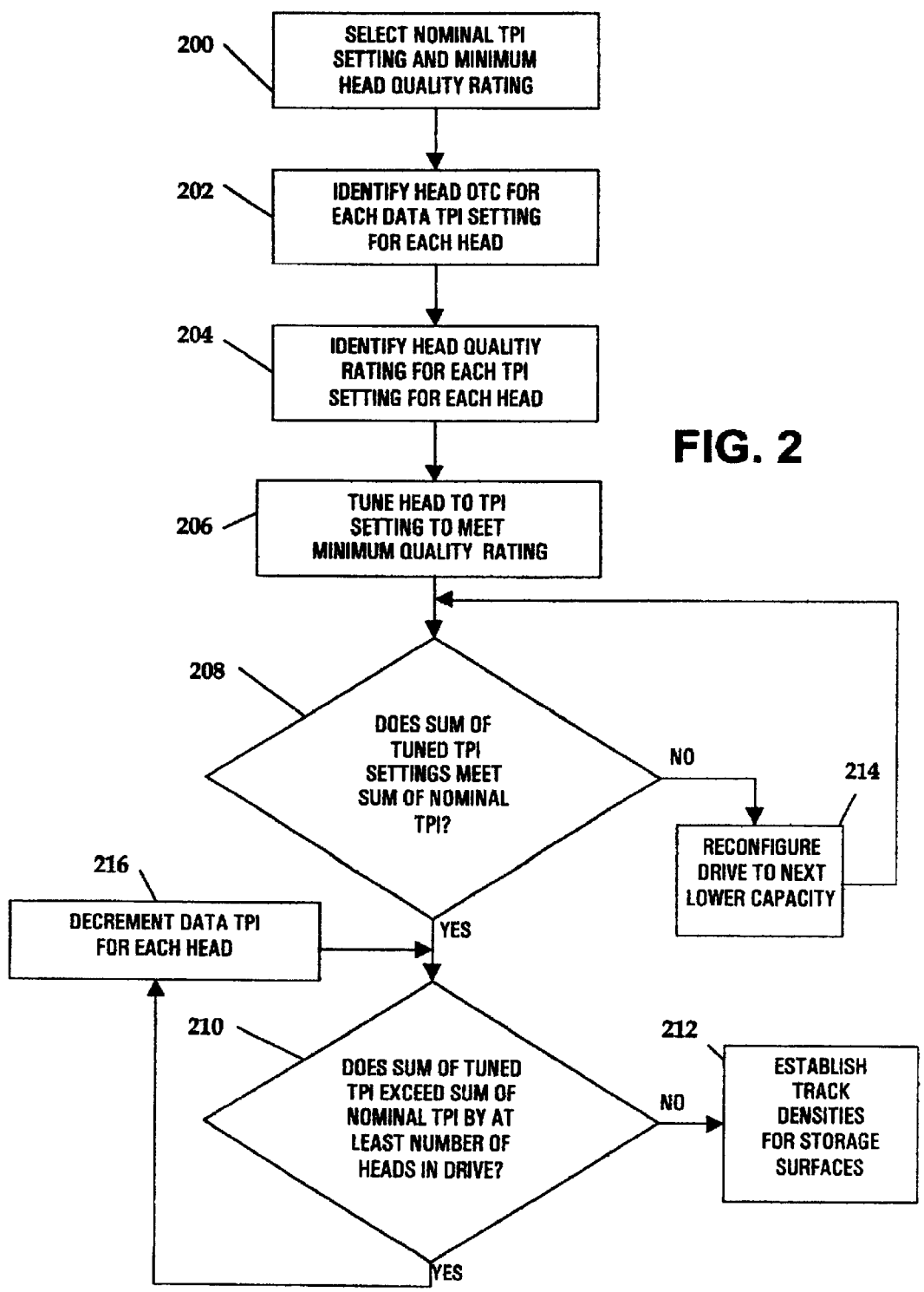
FIG. 2 is a diagram illustrating a process in accordance with an embodiment of the invention.

FIG. 2 is an illustration of a process flow in accordance with one embodiment of the present invention. At step 200, a nominal data TPI setting and a minimal head quality are assigned to all heads 111 of drive 100 based on the design requirements of drive 100. Each data TPI setting identifies a standard track density on the confronting storage surface. As explained further below, the head quality rating represents a level of off-track performance of the head 111 for a given error rate. For example, a nominal data TPI setting of 8 and a minimum head quality rating of 28 might be assigned.

At step 202, an off-track capability (OTC) test is performed for all of heads 111 of drive 100 to identify OTC performance over a range of data TPI settings. For example, Table I identifies several data TPI settings and the associated ratios of the widths of the data and servo tracks. At the nominal TPI setting (8), the ratio of the widths is 1.

TABLE I

| Data TPI Setting | Data/Servo Ratio |
|---|---|
| 5 | 1.15 |
| 6 | 1.10 |
| 7 | 1.05 |
| 8 (nominal) | 1.00 |
| 9 | 0.95 |
| 10 | 0.90 |
| 11 | 0.85 |

In Table I, the data TPI setting of 5 has the, least number of tracks and is thus easiest to read, while data TPI setting of 11 has the most number of tracks and is the hardest to read.

Figure 3:
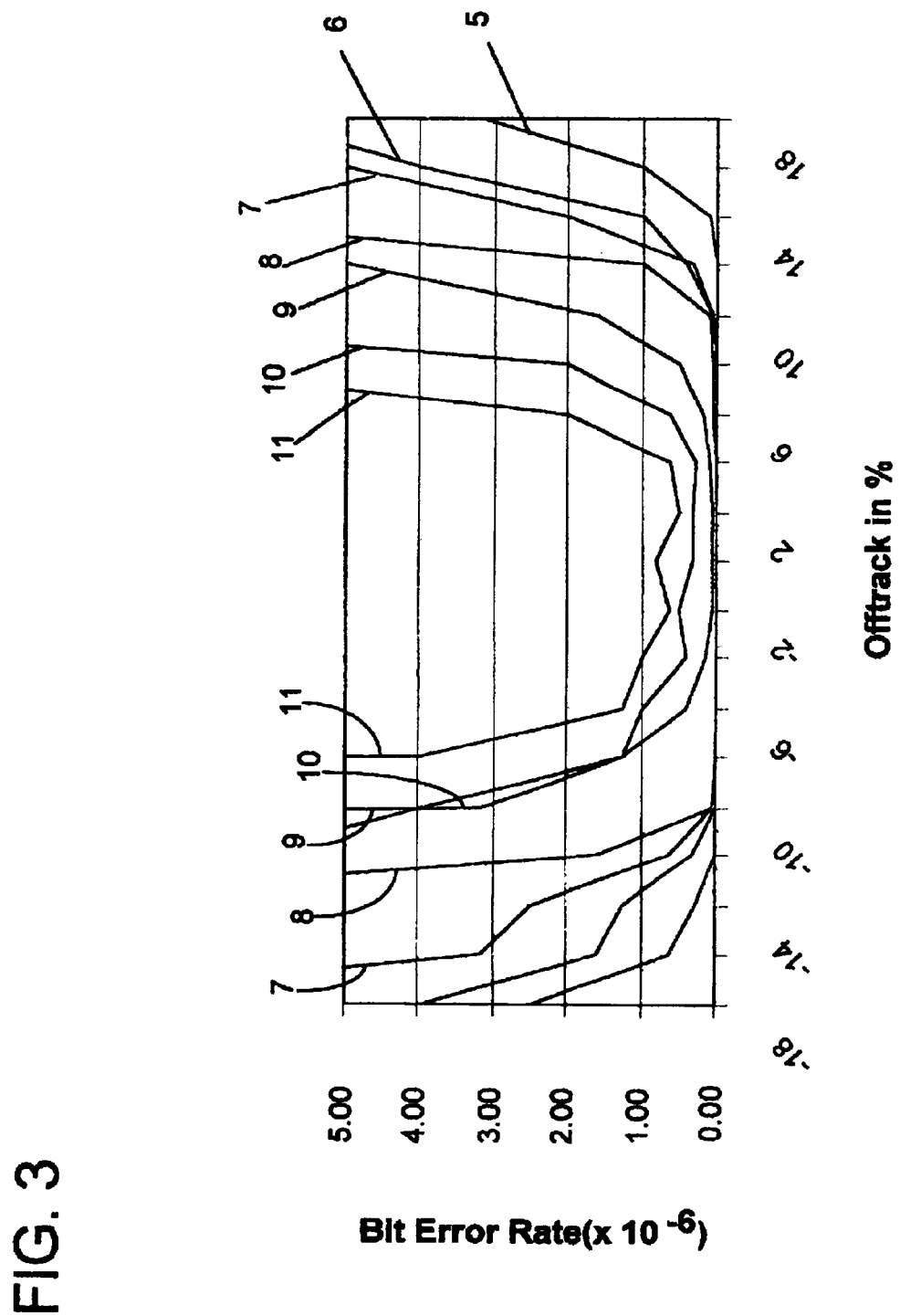
FIG. 3 is a graph useful in explaining the process illustrated in FIG. 2.

OTC is a standard test by which a test track and two adjacent tracks are written. The head 111 under test is set to an off-track position relative to the test track, and a fixed amount of test data are read from the test track. An error rate is then obtained, from which a bit error rate is computed. The bit error rate is expressed as the number (N) of read errors per $10^x$ bits, or more simply as $N \times 10^{-x}$. Based on a range of off-track positions at which head 111 is tested (e.g., between −18% and +18% of track center), a graph as illustrated in FIG. 3 can be plotted. The test is repeated for various track densities, each having an associated TPI setting.

The test is repeated for each TPI setting over a range of TPI settings, such as 5 to 11, where 5 is the lowest TPI density of the range and 11 is the highest density. Upon completion of the OTC test for one head 111, the test is repeated for all other heads 111 of drive 100. The graph of FIG. 3 illustrates the results of an OTC test for one head 111 of drive 100 at each TPI setting between 5 and 11 (where 8 is nominal). Thus, at a TPI setting of 8, head 111 under test demonstrates an error rate better than 2 between positions that are −10% and +14% of track center.

Each head 111 has a head quality rating based on the off-track capability. Table II correlates OTC test results to standard head quality ratings.

TABLE II

| Off-track capability | Head Quality Rating |
|---|---|
| 2% | 20 |
| 4% | 22 |
| 6% | 24 |
| 8% | 26 |
| 10% | 28 |
| 12% | 30 |
| 14% | 32 |
| 16% | 34 |
| 18% | 36 |

The design specifications for disc drive 100 will assign a minimum head quality rating for each head 111 of drive 100. The head quality rating for a given head 111 is identified from Table II as that associated with the position that is X% off track center where the head can read data within the error rate established by the design specifications for the disc drive. For purposes of example, the present description shall assume a minimum head quality rating of 28 is specified, representing that each head 111 will read data within the design error rate when respective the head 111 is positioned 10% off track center (i.e., is positioned off track center as far as 10% of the distance to the edge of the track).

The head quality rating of a head 111 is determined by accessing how far the head 111 can go off-track at a given error rate. At each off-track setting, head 111 performs at some error rate. At step 204, the head 111 is assigned a head quality rating based on the observed off-track position at a specified error rate. Each head 111 is set to various off-track positions relative to the test track and the test data are read from the test track to determine the bit error rate. Table III illustrates an example of the result of the OTC test using an error rate of $2.00 \times 10^{-6}$ from FIG. 3. Using a data TPI setting of 9, for example, at $2.00 \times 10^{-6}$ error rate head 111 has off-track capability between −8% and +12%. The off-track capability is selected as the absolute value of the smaller number, meaning the head has an off-track capability of 8%. From Table II, the off-track capability of 8% is converted to a head quality rating of 26. This process is repeated for all of the TPI settings in the range of settings for head 111. Table III illustrates an example of the head quality for one of heads 111, designated HD 0, based on the range of TPI settings between 5 and 11.

TABLE III

| TPI Setting | HD 0 Head Quality |
|---|---|
| 5 | 34 |
| 6 | 32 |
| 7 | 30 |
| 8 (nominal) | 28 |
| 9 | 26 |
| 10 | 26 |
| 11 | 24 |

From the data of Table III, the head quality of head HD 0 meets the requirements of the drive by providing a head quality of 28 at the nominal TPI setting of 8.

This process is repeated for the other heads 111, designated HD 1 to HD 3, of drive 100. Table IV illustrates an example of the head quality for heads HD 0 to HD 3 of a four-head drive.

TABLE IV

| TPI Setting | HD 0 Head Quality | HD 1 Head Quality | HD 2 Head Quality | HD 3 Head Quality |
|---|---|---|---|---|
| 5 | 34 | 28 | 36 | 34 |
| 6 | 32 | 28 | 36 | 32 |
| 7 | 30 | 26 | 34 | 32 |
| 8 (nominal) | 28 | 24 | 34 | 30 |
| 9 | 26 | 22 | 28 | 28 |
| 10 | 26 | 22 | 26 | 26 |
| 11 | 24 | 20 | 26 | 24 |

From Table IV, it can be summarized that head HD 0 has a head quality of 28 at the nominal TPI setting, which meets to the drive requirement. Head HD 1 has a head quality of 24 at nominal TPI, which is below the drive requirement, and heads HD 2 and HD 3 have head qualities of 34 and 30, respectively, which are above the drive requirement.

In a drive without TPI tuning in accordance with an embodiment of the present invention, the TPI setting will be set to 8, 8, 8, 8 for heads HD 0, 1, 2 and 3 respectively, and drive 100 will fail qualification due to the failure of head HD 1. As a result, it will have to be necessary to either re-work drive 100 to replace head HD 1, or reconfigure drive 100 to a model of lower capacity. Using TPI tuning according to an embodiment of the present invention, the data TPI is tuned for each disc surface at step 206 by setting the TPI to 8, 6, 9 and 9 for the storage surfaces confronting heads 0, 1, 2 and 3, respectively. Consequently, the desired head quality rating of at least 28 (see Table IV) is maintained for each head/surface combination for disc drive 100. Thus, the recording surface confronting head HD 1, which is the relatively weaker head 111 in terms of head quality, has its TPI setting reduced, while the recording surfaces confronting heads HD 2 and HD 3, which are the two relatively stronger heads 111 in terms of head quality, have their TPI increased. In this way the overall OTC margin for the four heads 111 is closer and the drive 100 has its overall OTC margin improved without changing the drive capacity.

At step 208 of FIG. 2, a determination is made as to whether the sum of the tuned data TPI settings for all heads 111 in drive 100 meets (equals or exceeds) the sum of the nominal TPI settings. In the case of the example of Table IV, for four heads 111 and a nominal TPI setting of 8, the sum of nominal settings is 32, and the sum of the tuned TPI is also 32 (8+6+9+9). Stated another way, the average tuned TPI (which is 8 in the example) equals or exceeds the nominal TPI. Consequently, the minimum drive requirements are satisfied, and the process continues to step 210. Since in the example of Table IV the tuned TPI settings just equals the nominal TPI, the process continues to step 212 to end the tuning process and establish the data TPI for the storage surfaces at settings 8, 6, 9 and 9 for heads HD 0–3, respectively.

If, at step 208, the sum of tuned TPI settings exceeds the nominal TPI, disc drive 100 has some OTC margin to spare. If the margin is large enough, the tuned TPI might be lowered for some or all disc surfaces, as long as the minimum head quality rating for each head 111 is maintained. Consider a drive 100 with the head quality of a four-head drive described in Table V, where the minimum head quality rating is specified as 28.

TABLE V

| TPI Setting | HD 0 Head Quality | HD 1 Head Quality | HD 2 Head Quality | HD 3 Head Quality |
|---|---|---|---|---|
| 5 | 36 | 36 | 36 | 36 |
| 6 | 36 | 34 | 36 | 34 |
| 7 | 34 | 32 | 34 | 32 |
| 8 (nominal) | 34 | 30 | 32 | 32 |
| 9 | 28 | 30 | 32 | 30 |
| 10 | 26 | 28 | 30 | 28 |
| 11 | 26 | 26 | 28 | 26 |

Applying the illustrative embodiment of the present invention as thus far described, the tuned setting of drive 100 would be chosen at 9, 10, 11, 10 for heads HD 0, HD 1, HD 2 and HD 3, respectively, where the required quality rating is 28. In this case, the sum of the TPI settings is 40, which will result in excess capacity for drive 100. If at step 210 the sum of the tuned TPI settings exceeds the sum of nominal TPI settings by an amount at least equal to the number of heads 111, at step 216 the TPI settings for each head 111 are reduced, in this case by 2 because the sum of tuned TPI settings exceeds the sum of nominal TPI settings by twice the number of heads. Consequently, the adjusted TPI settings are 7, 8, 9, 8. The overall capacity of drive 100 will remain unchanged, yet the OTC for all the heads 111 is improved.

If, at step 208, the sum of tuned TPI settings did not meet the nominal TPI, the process continues to step 214 to reconfigure disc drive 100 to one of lower capacity. More particularly, the total OTC margin falls below the drive requirement, so drive 100 does not have sufficient capacity to meet the nominal data TPI setting. This example is set forth in Table VI.

TABLE VI

| TPI Setting | HD 0 Head Quality | HD 1 Head Quality | HD 2 Head Quality | HD 3 Head Quality |
|---|---|---|---|---|
| 5 | 28 | 30 | 32 | 28 |
| 6 | 28 | 30 | 30 | 26 |
| 7 | 26 | 28 | 28 | 26 |
| 8 (nominal) | 24 | 26 | 26 | 24 |
| 9 | 22 | 24 | 26 | 22 |
| 10 | 22 | 24 | 24 | 22 |
| 11 | 20 | 22 | 24 | 20 |

In this example, the data TPI settings of the drive will be chosen at 6, 7, 7, 5 to meet head quality requirements of 28, but since the tuned TPI setting is below the nominal TPI, the drive may be reconfigured to one of lower capacity.

In summary, the TPI density for the data storage surfaces of a storage device is tuned so that a head 111 that fails to meet head quality requirements at a nominal TPI can be used in combination with a storage surface at a TPI density that is lower than nominal to meet head quality requirements, while at least one other head/surface combination operates at a TPI density that is higher than nominal to compensate for lost storage capacity.

In one embodiment, a minimum head quality is assigned for the data storage apparatus (such as step 200), and the active head quality is identified for each of the heads (such as 111) for each of a plurality of track densities (such as step 204). A tuned track density is selected for each head based on a track density at which the minimum head quality is achieved.

In some embodiments, the head quality is identified by identifying an off-track capability for each head (such as 111) for each of a plurality of track densities (such as step 202). The head quality for each track density for each head (such as 111) is identified from the off-track capability and a specified error rate (step 204).

In some embodiments, the track density is selected as that track density that matches the track density corresponding to the minimum head quality rating (such as step 206). The average of the tuned track densities is compared to the nominal track density. The tuned track density is selected for each storage surface only if the average of the tuned track densities is at least as great as the nominal track density (such as step 210).

In another embodiment a data storage device includes a plurality of head/surface combinations each including a storage surface containing adjacent data storage tracks and a head arranged to transfer information with the data storage tracks. Means (FIG. 2) establishes different data track densities on at least two storage surfaces. In particular, the means establishing the data track density comprises an arrangement of the data storage tracks at densities defined by an off-track capability of the confronting head.

Although the present invention has been described with reference to magnetic disc drives, those skilled in the art will recognize that the present invention may be practiced with other system modifications, including but not limited to optical and magneto-optical disc drives and systems employing other track density technologies, such as tape drives, drum drives and the like.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the track density tuning while maintaining substantially the same functionality without departing from the scope and spirit of the present invention. In addition, although embodiments of the invention are described as including uniform reduction of TPI settings to uniformly improve off-track capabilities of the all of the heads of the storage apparatus where excess off-track capabilities are identified, the off-track capabilities may be improved in a non-uniform manner. Moreover, where excess off-track capabilities are identified, the higher TPI settings may be employed to increase capacity of the storage apparatus. Thus, while one embodiment of the invention described herein as employing heads that fails to meet head quality requirements at nominal TPI, equivalent alternate embodiments the invention might also be employed to improve storage capacities of the storage apparatus. Moreover, although embodiments of the invention are described herein as directed to concentric and parallel tracks, it will be appreciated by those skilled in the art that the teachings of the embodiments of the present invention can be applied to spiral and helical tracks, without departing from the scope and spirit of the invention.

What is claimed is:

1. A process of defining track densities for data storage tracks on each of a plurality of storage surfaces of a data storage apparatus wherein each storage surface is associated with a transducer, the process comprising steps of:

a) assigning a nominal track density and minimum transducer quality for the data storage apparatus, the nominal track density having a setting value;

b) identifying a transducer quality of each transducer at each of a first plurality of incremental track densities smaller than the nominal track density and at each of a second plurality of incremental track densities greater than the nominal track density, each incremental track density having a setting value;

c) identifying each first transducer having the minimum transducer quality at a track density that is smaller than the nominal track density;

d) for each first transducer, selecting a track density for the respective associated storage surface from the first plurality of track densities, the transducer associated with the selected track density having a transducer quality that is at least as great as the minimum transducer quality;

e) for each first transducer, identifying the setting value of the respective first transducer's selected track density;

f) identifying each second transducer having the minimum transducer quality at a track density that is greater than the nominal track density;

g) for each second transducer, selecting a track density for the respective associated storage surface from the second plurality of track densities, the transducer associated with the selected track density having a transducer quality that is at least as great as the minimum transducer quality, an average of the setting values of the selected track densities of all of the storage surfaces being at least as great as the setting value of the nominal track density.

2. The process of claim 1, wherein step (b) comprises steps of:

b1) for each of the plurality of track densities, identifying an off-track position for each transducer at which the transducer achieves a selected error rate, and b2) identifying the transducer quality for each track density for each transducer based on the off-track position.

3. The process of claim 1, further including:

h) if the average of the setting values is greater than the setting value of the nominal track density, adjusting the tuned track densities for first and second transducers until the average of the setting values equals the setting value of the nominal track density.

4. The process of claim 3, wherein the track density for each storage surface associated with a second transducer is selected as the maximal track density that the respective second transducer has the minimum transducer quality.

5. The process of claim 4, wherein the setting values for the first and second transducers are based on the increments of the track densities.

6. The process of claim 1, wherein the setting values for the first and second transducers are based on the increments of the track densities.

7. A data storage device including:

a plurality of transducer/surface combinations each comprising a storage surface having adjacent data storage tracks and a transducer operably arranged to transfer information with the data storage tracks, the data storage device having a nominal track density, the plurality of transducer/surface combinations including at least a first transducer/surface combination having a first transducer having a minimum transducer quality at a track density that is smaller than the nominal track density and at least a second transducer/surface combination having a second transducer having the minimum transducer quality at a track density that is greater than the nominal track density, each track density having a setting value;

the track density of each storage surface associated with a first transducer being selected from a plurality of track densities that are incrementally smaller than the nominal track density so that the transducer quality associated with the respective first transducer is at least as great as the minimum transducer quality;

the track density of each storage surface associated with a second transducer being selected from a plurality of track densities that are incrementally greater than the nominal track density so that the transducer quality associated with the respective second transducer is at least as great as the minimum transducer quality, and an average of setting values of the transducer/surface combinations being at least as great as the setting value of the nominal track density.

8. The data storage device of claim 7, wherein the average setting value equals the setting value representing the nominal track density.

9. The data storage device of claim 8, wherein the setting values are based on the increments of the track densities.

10. A disc drive comprising a data storage disc and a transducer in a data reading and writing operable relationship with the data storage disc, the transducer imparting electrical signals from a controller defining a data storage track density on the storage disc established by a process comprising steps of:

a) assigning a nominal track density and minimum transducer quality for the data storage apparatus, the nominal track density having a setting value;

b) identifying a transducer quality of each transducer at each of a first plurality of incremental track densities smaller than the nominal track density and at each of a second plurality of incremental track densities greater than the nominal track density, each incremental track density having a setting value;

c) identifying each first transducer having the minimum transducer quality at a track density that is smaller than the nominal track density;

d) for each first transducer, selecting a track density for the respective associated storage surface from the first plurality of track densities, the transducer associated with the selected track density having a transducer quality that is at least as great as the minimum transducer quality;

e) for each first transducer, identifying the setting value of the respective first transducer's selected track density;

f) identifying each second transducer having the minimum transducer quality at a track density that is greater than the nominal track density;

g) for each second transducer, selecting a track density for the respective associated storage surface from the second plurality of track densities, the transducer associated with the selected track density having a transducer quality that is at least as great as the minimum transducer quality, an average of the setting values of the selected track densities of all of the storage surfaces being at least as great as the setting value of the nominal track density.

11. The process of claim 10, wherein step (b) comprises steps of:

b1) for each of the plurality of track densities, identifying an off-track position for each transducer at which the transducer achieves a selected error rate, and b2) identifying the transducer quality for each track density for each transducer based on the off-track position.

12. The process of claim 10, further including:

h) if the average of the setting values is greater than the setting value of the nominal track density, adjusting the tuned track densities for first and second transducers until the average of the setting values equals the setting value of the nominal track density.

13. The process of claim 12; wherein the track density for each storage surface associated with a second transducer is selected as the maximal track density that the respective second transducer, has the minimum transducer quality.

14. The process of claim 13, wherein the setting values for the first and second transducers are based on the increments of the track densities.

15. The process of claim 10, wherein the setting values for the first and second transducers are based on the increments of the track densities.

* * * * *